July 13, 1965     J. C. DEDDENS ET AL     3,194,743

NUCLEAR REACTOR CORE ARRANGEMENT

Filed March 9, 1959     2 Sheets-Sheet 1

INVENTORS
James C. Deddens
Howard S. Barringer
Norbert L. Kopchinski, Jr.
Gilbert Wayne Meyers

BY
ATTORNEY

July 13, 1965 J. C. DEDDENS ET AL 3,194,743
NUCLEAR REACTOR CORE ARRANGEMENT
Filed March 9, 1959 2 Sheets-Sheet 2

INVENTORS
James C. Deddens
Howard S. Barringer
Norbert L. Kopchinski, Jr.
Gilbert Wayne Meyers BY *[signature]*
ATTORNEY

United States Patent Office 3,194,743
Patented July 13, 1965

3,194,743
NUCLEAR REACTOR CORE ARRANGEMENT
James C. Deddens, Norbert L. Kopchinski, Jr., and Gilbert Wayne Meyers, Lynchburg, and Howard S. Barringer, Rustburg, Va., assignors to The Babcock & Wilcox Company, New York, N.Y., a corporation of New Jersey
Filed Mar. 9, 1959, Ser. No. 798,031
7 Claims. (Cl. 176—43)

This invention relates in general to nuclear reactors wherein a controlled fission chain reaction takes place, and more particularly it relates to a core for a nuclear reactor containing both movable and fixed control rods.

In the use of nuclear reactors for the commercial generation of electrical power, it is essential for purposes of efficient and economical operation to provide a core of extended lifetime. A core, as referred to herein, is a structure of discrete bodies of fissionable material and non-fissionable material arranged according to a regular geometrical pattern. An example of such an extended lifetime in a core is one having a lifetime of at least 600 full power days. In such a core it is necessary to provide an excess mass of fissionable material in addition to that required to sustain a fission chain reaction in a cold clean core, that is, a reactor core at or near room temperature in which a chain reaction has not been established. The excess mass of fissionable material is required to provide reactivity for temperature rise, burn up of fuel, build up of neutron absorbing fission products and other miscellaneous reaction poisoning effects. Poisoning effects refer to the characteristic of a material to absorb neutrons unproductively and reduce the reactivity of a reactor. Therefore, a control system is required to control this excess reactivity within the core and in addition to regulate the power level of the core and provide a means for scramming or fast shut down of the reactor.

In the past, reactors have been controlled by movable control rods which are made of a material having a high capacity for absorbing neutrons. These movable control rods are arranged so that they may be very accurately positioned in the core. Because of the accuracy of movement and the high degree of safety required for the operation of the movable control rods and their associated drive mechanism, they are very complicated and hence very expensive. Therefore, it is an object of the present invention to reduce the number of movable control rods used within the core of a nuclear reactor.

Accordingly, the present invention provides a core for a nuclear reactor comprising a plurality of symmetrically arranged, elongated, individually removable fuel element assemblies spaced in a regular pattern, so that they provide a number of flow channels therebetween for the length of adjoining fuel element assemblies. A number of both movable control rods and fixed control rods are arranged within the flow channels between fuel element assemblies to hold down and control the excess reactivity within the core. The movable control rods are longitudinally positionable through the core for the length of the fuel element assemblies. The fixed control rods though not movably positionable, they are removable from the core when the reactor is shut down.

In addition, the present invention provides flux depressor plates located in the flow channels about the outer portion of the core. These flux depressor plates reduce the flux or power peaking in the core, especially in a direction extending radially from the center of the core.

Further, the present invention provides a core which is divided into a number of symmetrical, longitudinally uniform fuel concentration zones. Each fuel concentration zone has a substantially different fissionable to fertile material ratio. The fuel concentration zones comprise a centrally arranged inner zone and at least one annular shaped concentrically disposed outer zone with the fissionable to fertile material weight percent ratio being lowest in the inner zone and increasing outwardly to the periphery of the core.

Moreover, this invention provides a core arrangement containing a number of uniform groups of combination movable control rod-fuel element assemblies. These groups are made up of four fuel element assemblies arranged in a square box-like formation. The fuel element assemblies in each group are evenly spaced to provide a centrally located cross-shaped flow channel therebetween. A movable control rod is positioned within the central flow channel and is longitudinally positionable therein for the length of the fuel element assemblies. In addition to the movable control rod contained within the center of the group, the flow channels which surround the individual movable control rod-fuel element assembly group have contained therein fixed control rods or filler rods which have a shape substantially the same as the fixed control rod. By this arrangement each group has a movable control rod disposed in the center of a group of four fuel element assemblies and is surrounded by either or both a number of fixed control rods or filler rods.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which we have illustrated and described a preferred form of our invention.

Figure 1:
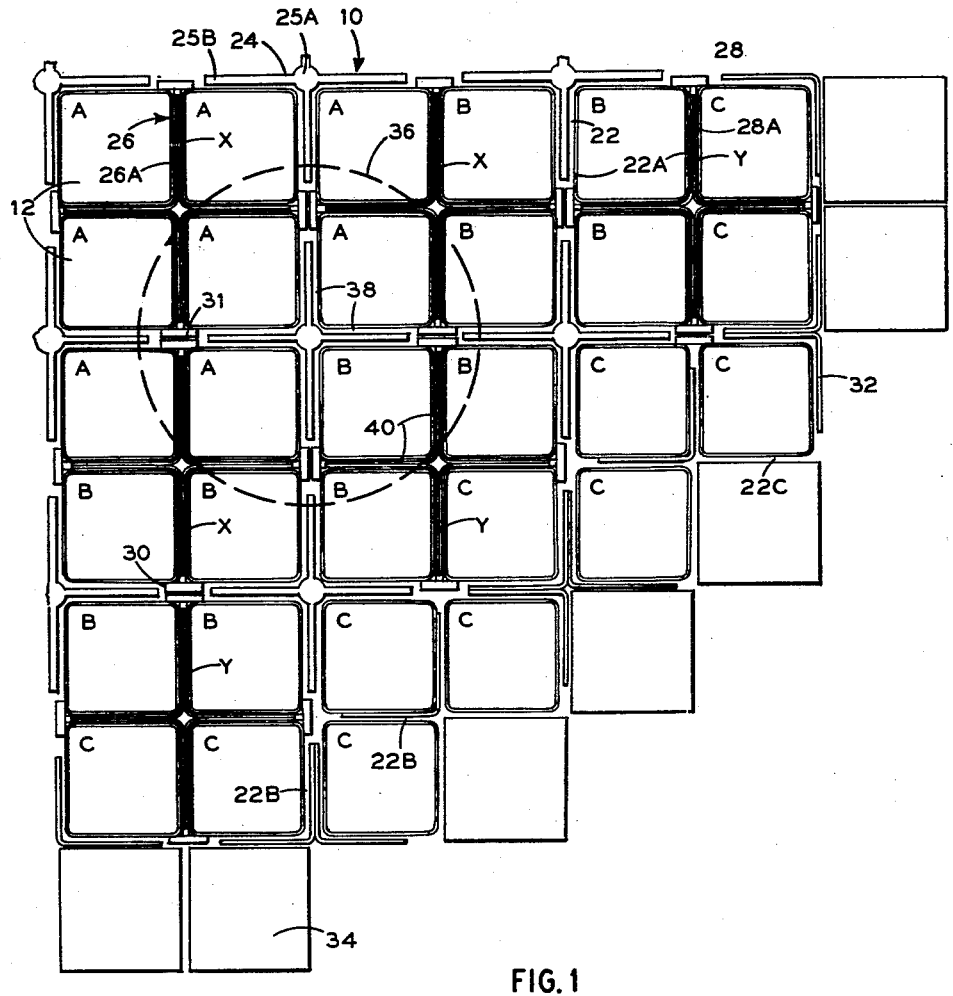
FIG. 1 is a horizontal cross-section of one quadrant of a core embodying the present invention.
Figure 2:
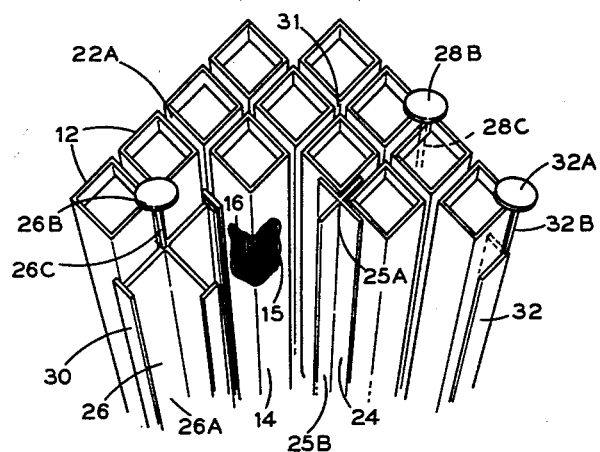
FIG. 2 is a three dimensional view of a portion of the core shown in FIG. 1.
Figure 3:
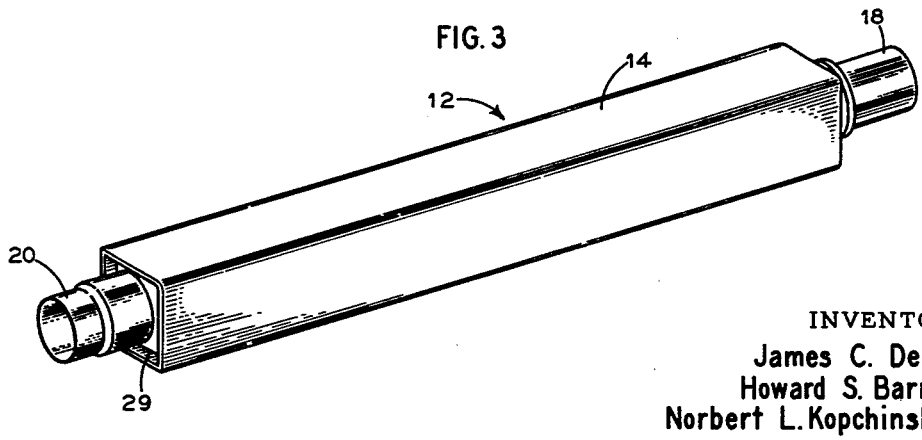
FIG. 3 is a perspective view of a fuel element assembly.

In FIG. 1 there is shown a typical quadrant of a core 10 embodying the present invention. The core as shown when arranged within a nuclear reactor would be positioned within a pressure vessel (not shown) and enclosed laterally by thermal shielding and supported longitudinally between a pair of spaced grid plates (not shown). A typical nuclear reactor in which the core 10 could be used is illustrated and described in the co-pending application of Melvin F. Sankovich, Serial No. 712,512, now abandoned, filed January 31, 1958 by the common assignee.

The fissionable material in the core 10 is contained within a plurality of vertically arranged, elongated, individually removable fuel element assemblies 12 of substantially square cross-section. A can 14 which forms the outer walls of the fuel element assembly 12 provides a chamber 15 within which a number of closely spaced fuel pins 16 containing the fissionable material are arranged. The fuel pins 16 are all of equal length and provide uniform length active fuel regions in each assembly 12 of the core. The can is closed at one end by an inlet adapter 18 and at the opposite end by an outlet adapter 20. The inlet and outlet adapters 18, 20 fit into grid plates (not shown) which position the fuel element assemblies within the core of a nuclear reactor. The fuel element assemblies are arranged in the core for a coolant to flow both through the chamber 15 and about the can 14 to remove the heat generated within the core.

The fuel element assemblies 12 are arranged in three fuel concentration zones (see FIG. 1); an inner zone having fuel element assemblies marked A and two outer zones with assemblies marked B and C. Each zone has a uniform fissionable to fertile material weight percent ratio substantially different from that of the other zones. The inner zone is centrally arranged within the core and the two outer zones are concentrically disposed thereabouts, with the zone having assemblies marked B positioned between the other two zones.

It is the purpose of the varied fuel concentration zones to flatten the flux gradient across the core and thereby to achieve a better distribution of power density therein. The fissionable to fertile material weight percent ratio is lowest in the inner zone and increases outwardly. The core illustrated herein is considered typical and has a fuel mixture in the fuel element assemblies made up of fully enriched $UO_2$, as the fissionable material, and $ThO_2$, as the fertile material. The quantity of fissionable material contained within the three zone arrangements is as follows: in the zone having assemblies marked A approximately 6.85 kg. of $UO_2$ per assembly, in the zone having assemblies marked B approximately 9.10 blies marked C approximately 10.91 kg. of $UO_2$ per assembly. The remainder of the fuel mixture in all these assemblies is $ThO_2$. The ratio of the fissionable material in the three zones is roughly on the order of 3 to 4 to 5.

The fuel element assemblies are closely and evenly spaced in a square lattice throughout the core and form first and second interior flow channels 22A, 22B therebetween extending for the length of the cans 14 of the fuel element assemblies. The first interior flow channels 22A comprise those located between fuel element assemblies marked A and B plus the channels which separate the assemblies marked B from those marked C. The second interior flow channels 22B are those which separate adjoining fuel element assemblies marked C. In addition, exterior flow channels 22C are located along the faces of the assemblies marked C which form the perimeter of the fuel element assemblies in the core.

A number of movable control rods 24 are symmetrically arranged within the core and located in a portion of the first interior flow channels 22A. The movable control rods 24 are cruciform in cross-section and extend within the flow channels for approximately the length of the can 14. Each of the movable control rods is made up of a central hub 25A and four equal width blades 25B arranged at right angles to one another and extending laterally from the hub. The movable control rods 24 are positioned so that the hubs 25A are located at the intersection of four first interior flow channels 22A with each blade 25B extending into one of the channels. The width of the blades 25B is less than the width of the fuel element assemblies they separate. These movable control rods are selectively longitudinally positionable in the first interior flow channels 22A to provide variable control for both the power level in the core and the reactivity required for the various poisoning effects which develop during the lifetime of the core. A typical example of a movable control rod showing its arrangement within the core of a nuclear reactor and also a portion of its driving mechanism is illustrated in the application of Sankovich which was previously mentioned.

One of the movable control rods is positioned on the longitudinal center line of the core and the remaining rods are disposed symmetrically and uniformly thereabout in two spaced concentric rings. The movable control rods 24 are made of hafnium, however, there may be substituted any other material having a high neutron absorption cross-section, such as cadmium, boron-stainless steel, etc.

Both fixed controls rods 26 and flow control filler rods 28 are positioned within the remaining first interior flow channels 22A disposed between the fuel element assemblies 12. The centers of the fixed control rods 26 and the flow control filler rods 28 are arranged diagonally across fuel element assemblies from the center of movable control rods. The fixed control rods 26 are cruciform in cross-section and extend within the flow channels for approximately the length of the can 14 of the fuel element assemblies 12.

The cruciform cross-section of the fixed control rods 26 is formed by four control angles 26A arranged in back-to-back relationship, with the angles joined together. The legs or blades of the fixed control rods 26 have approximately the same width as that of the can 14 of the fuel element assemblies 12. The fixed control rods are made of a material having a high neutron absorption cross-section, and in the one illustrated it is boron-stainless steel with 1% of 80% enrichment boron in type 304 steel.

The flow control filler rods 28 and filler angles 28A have the same shape and dimensions as the fixed control rods 26 and control angles 26A and may be used to replace them. However, the filler rods 28 are made of a material having a low neutron absorption cross-section, and in this instance, zircaloy 2.

Flow control blocks 30 are attached to the longitudinal edges of the outstanding legs or blades of each of the fixed control rods 26 and flow control filler rods 28 and extend for the length thereof. These blocks 30 are located in the intersection 31 of the first and second interior flow channels, 22A, 22B, which adjoin the longitudinal edges of the control rods and filler rods. The blocks 30 are rectangular in cross-section with their longer dimension or width at right angles to the leg or blade to which they are attached. The width of each block is such that it spans the flow channel containing the blade to which it is joined. In addition the blocks are very closely spaced from the fuel element assemblies 12 which form the flow channel. Since the blocks 30 are attached to each blade of a fixed control rod or flow channel filler rod they form lateral spacers for the rods to maintain their alignment within the flow channels while their dimensions are such that a small amount of transverse movement is allowed.

Both the fixed control rods 26 and the flow control filler rods 28 are comprised of a support disk 26B, 28B and support shaft 26C, 28C, respectively, in addition to the control and filler angles 26A, 28A. The support disks 26B, 28B rest on the transverse surface 29 of the fuel element assemblies 12 located at the upper end of cans 14. The support shafts, 26C, 28C, are attached at their upper ends to the support disks and extend vertically downward into the flow channels 22 where they are joined and act as hangers to support the control and filler angles 26A, 26A.

In FIG. 1 which illustrates one typical quadrant of a core embodying the present invention, an arrangement of fixed control rods 26 and flow control filler rods 28 as required for a cold, clear core is set forth. The fixed control rods are indicated with an X and the filler rods with a Y.

Flux depressor plates 32 encircle the fuel element assemblies marked C. The flux depressor plates 32 are formed as angles having equal width outstanding legs and a length approximately half the length of the active fuel region within the fuel element assemblies. The plates are made of type 304 stainless steel, however, they may effectively be made of other materials having similar neutron absorbing capabilities.

The flux depressor plates 32 are located in closely spaced relationship to an exterior corner of the assemblies marked C. One leg of the plate is positioned in an exterior flow channel 22C while the other leg extends into a second interior flow channel 22B. Along the length of the flow channels the plates are disposed opposite the middle half of the assemblies. The purpose of the flux depressor plates is to reduce the temperature gradient in the assemblies marked C in a radial direction from the center of the core to thereby avoid burnout of the assemblies.

The flux depressor plates 32 are supported within the core in the same manner as the fixed control rods and flow control filler rods. A support disk 32A rests on the transverse surface 29 of the fuel element assemblies and a support shaft 32B joined to the disk 32A at its upper end and to the plates 30 or angles at its lower end acts as a hanger therefor.

At fixed locations around the outside of the core hold down columns 34 are positioned to prevent displacement of the core due to hydraulic uplift caused by the coolant as it flows upwardly therethrough. The hold down columns 34 are somewhat similar in shape to the fuel element assemblies and have end connections which permit them to be fitted into the grid plates (not shown).

The various elements which make up the core are disposed therein to provide a number of uniform groups 36 of movable control rod-fuel element assemblies arranged in a regular pattern. Each group is made up of four fuel element assemblies 12 disposed in a square box-like formation. The first interior flow channels 22A located between the assemblies in each group form a cross-shaped control flow channel 38. A movable control rod 24 is arranged within each of the central flow channels 38.

Each group 36 is surrounded by first interior flow channels which form peripheral flow channels 40 common to adjoining groups. Fixed control rods 26 and/or flow control filler rods 28 are positioned in the peripheral channels 40. The combination of the fixed control rods 26 and/or filler rods 28 completely enclose and separate adjoining groups 36. Since the core is intended for use in a pressure vessel of circular cross-section the core itself is roughly circular in cross-section. For this reason in addition to the groups 36 of movable control-fuel element assemblies there are a number of fuel element assemblies marked C about the periphery to complete the core.

The preferred embodiment of the core in the present invention as illustrated operates in the following manner. The core comprises 120 fuel element assemblies 12, 32 marked A, 44 marked B and 44 marked C, twenty-one movable control rods 24, twelve fixed control rods 26 and an equal number of flow channel filler rods 28 arranged in a symmetrical pattern. In the cold clean core the movable control rods are inserted for their full length into the first interior flow channels 22A.

As a fission chain reaction is initiated within the core the movable control rods are longitudinally positioned in the flow channels to achieve the desired power level in the core. In addition, the movable control rods combine with the fixed control rods to supply the control required for the excess reactivity contained in the core. As the fissioning process continues, the amount of excess reactivity decreases and in turn the quantity of excess reactivity needed to be held down by the fixed rods 26 is also decreased.

At a predetermined point during the lifetime of the core, based on the quantity of excess reactivity required to be controlled, the reactor is shut down. Next, a number of the fixed control rods are removed from the core and the space which they occupied is taken by flow control filler rods. The filler rods as have been described heretofore have the same size and shape as the fixed control rod, but are made of a material which has a low neutron absorption cross-section and, therefore, they do not control the excess reactivity.

The fixed control rods are maintained in a generally symmetrical pattern in the core to provide a more uniform power density therein. Again the fission chain reaction is instituted and power level fixed by positioning the movable control rods. This procedure is repeated until the amount of excess reactivity within the core drops to a point where the fixed control rods prevent further criticial operation. At this stage the fixed control rods are removed and are replaced by flow control filler rods. Thereafter the core will be controlled only by the movable control rods and the remainder of the first interior flow channels will contain only flow control filler rods.

The quantity of cooant flowing through the core is a critical factor in the efficient operation of a nuclear reactor. Proper proportioning of the coolant flow must be maintained to prevent power peaking and to avoid burnout of the fuel element assemblies. Due to the symmetrical arrangement of the core in the present invention, and the fact that not all of the flow channels contain control rods, the flow control filler rods 28 and flow control blocks 30 are disposed therein to maintain the equal distribution of coolant throughout the core.

During the lifetime of a core in a nuclear reactor the fissionable material in the fuel element assemblies burns out and the assemblies must be replaced to maintain the power output of the core. When this occurs in the core of the present invention, rather than replacing all the fuel element assemblies, only those assemblies marked A which form the inner zone need be removed. The assemblies marked B are moved into the position left open by the assemblies marked A and in turn those marked C take over the spaces left open by the assemblies marked B. In this way a new group of fuel element assemblies are required only for that portion of the core which had assemblies marked C.

Though the preferred embodiment of this invention is described as containing a mixture of fully enriched uranium oxide and thoria, uranium oxide less than fully enriched could be used and it is possible that other mixtures of fissionable and fertile material could be used, such as uranium 233 or plutonium 239 with uranium 238 or natural uranium. Moreover, the invention should not be limited to the oxides of the fissionable and fertile material but also include the metallic forms of these materials. Further, this invention is not limited to fuel element assemblies using elongated fuel pins but fuel plates or tubes may also be used.

The fuel element assemblies in the present invention have a square cross-section which permit their placement in the core without any special orientation with respect to the adjoining assemblies.

Therefore, the present invention supplies a core arrangement for a nuclear reactor which is simply assembled and easily and economically controlled.

While in accordance with the provisions of the statutes we have illustrated and described herein the best form of the invention now known to me, those skilled in the art will understand that changes may be made in the form of the apparatus disclosed without departing from the spirit of the invention covered by the claims, and that certain features of the invention may sometimes be used to advantage without a corresponding use of other features.

What is claimed is:

1. In a nuclear reactor a core arranged for extended lifetime operation comprising a number of uniform groups of combination movable control rod-fuel element assemblies, each of said groups comprising a plurality of fuel element assemblies symmetrically arranged and uniformly spaced to form a central flow channel therewithin, said groups positioned to provide peripheral flow channels between the adjacent fuel element assemblies of adjoining groups, a movable control rod comprising a material having a high neutron absorption cross section and located within said central flow channel and longitudinally positionable therethrough, replaceable fixed control rods containing a material having a high neutron absorption cross section similar to that of said movable control rod positioned within a portion of said peripheral flow channels, and flow control filler rods having a low neutron absorption cross section, and disposed within the remaining portions of said peripheral flow channels, said fixed control rods being replaceable by said flow control filler rods during the lifetime of said core when the excess reactivity therein has been reduced obviating the need for at least some of said fixed control rods.

2. In a nuclear reactor a core arranged for extended lifetime operation comprising a number of uniform groups of combination movable control rod-fuel element assemblies, each of said groups comprising a plurality of fuel element assemblies symmetrically arranged and uniformly spaced to form a central flow channel therewithin, said groups positioned to provide peripheral flow channels between the adjacent fuel element assemblies of adjoining groups, a movable control rod containing a material having a high neutron absorption cross section and located within said central flow channel and longitudinally positionable therethrough, replaceable fixed control rods containing a material having a high neutron absorption cross section similar to that of said movable control rods positioned within a portion of said peripheral flow channels, flow control filler rods having a low neutron absorption cross section and disposed within the remaining portions of said peripheral flow channels, said fixed control rods being replaceable by said flow control filler rods during the lifetime of said core when the excess reactivity therein has been reduced obviating the need for at least some of said fixed control rods, and flux depressor means formed of a corrosion resistant material having a neutron absorption cross section characteristic substantially comparable to that of iron and arranged in the flow channels located about the periphery of the core to reduce power peaking in that area of the core.

3. In a nuclear reactor a core arranged for extended lifetime operation comprising a number of uniform groups of combination movable control rod-fuel element assemblies, each of said groups comprising a plurality of fuel element assemblies symmetrically arranged and uniformly spaced to form a central flow channel therewithin, said groups positioned to provide peripheral flow channels between the adjacent fuel element assemblies of adjoining groups, a movable control rod containing a material having a high neutron absorption cross section and located within said central flow channel and longitudinally positionable therethrough, replaceable fixed control rods containing a material having a high neutron absorption cross section similar to that of said movable control rods positioned within a portion of said peripheral flow channels, flow control filler rods having a low neutron absorption cross section and disposed within the remaining portions of said peripheral flow channels, said fixed control rods being replaceable by said flow control filler rods during the lifetime of said core when the excess reactivity therein has been reduced obviating the need for at least some of said fixed control rods, flow control blocks having a low neutron absorption cross section such as that of the flow control filler rods and formed of narrow longitudinally extending strips arranged at the intersections of the flow channels to maintain uniform distribution of coolant through the core, and flux depressor means formed of a corrosion resistant material having a neutron absorption cross section characteristic substantially comparable to that of iron and arranged in the flow channels located about the periphery of the core to reduce power peaking in that area of the core.

4. In a nuclear reactor a core arranged for extended lifetime operation comprising a number of uniform groups of combination movable control rod-fuel element assemblies, each of said groups comprising four fuel element assemblies of transverse rectangular cross section symmetrically arranged and uniformly spaced to form a cruciform shaped central flow channel therewithin, said groups positioned to provide peripheral flow channels between the adjacent fuel element assemblies of adjoining groups, a movable control rod of cruciform cross section containing a material having a high neutron absorption cross section and located within said central flow channel and longitudinally positionable therethrough, replaceable fixed control rods of cruciform cross section containing a material having a high neutron absorption cross section similar to that of said movable control rods positioned within a portion of said peripheral flow channels, and flow control filler rods of substantially the same shape as said fixed control rods and having a low neutron absorption cross section and disposed within the remaining portions of said peripheral flow channels, said fixed control rods being replaceable by said flow control filler rods during the lifetime of said core when the excess reactivity therein has been reduced obviating the need for at least some of said fixed control rods, flow control blocks having a low neutron absorption cross section similar to that of the flow control filler rods and formed of narrow longitudinally extending strips attached to the longitudinal edges of said fixed control rods and flow control filler rods and positioned at the intersections of the flow channels to maintain uniform distribution of coolant through the core, and flux depressor plates formed of a corrosion resistant material having a neutron absorption cross section characteristic substantially comparable to that of iron and arranged in the flow channels located about the periphery of the core to reduce power peaking in that area of the core.

5. A core for a nuclear reactor comprising a plurality of elongated fuel element assemblies uniformly spaced to provide flow channels therebetween for the length of adjoining assemblies, said core containing an excess mass of fissionable material in addition to that required to sustain a fission chain reaction whereby an extended core lifetime can be achieved, means to control the chain type fission reaction within said core comprising a number of replaceable fixed control rods containing a material having a high neutron absorption cross section and disposed within a portion of said flow channels, and flow control filler rods formed of material having a low neutron absorption cross section and having substantially the same shape as said fixed control rods and arranged within at least some of the remaining portion of said flow channels, said fixed control rods being replaceable by said flow control filler rods during the lifetime of said core when the excess reactivity within said core has been reduced obviating the need for at least some of said fixed control rods.

6. A core for a nuclear reactor comprising a plurality of elongated fuel element assemblies spaced in a regular pattern to provide intersecting coolant flow channels therebetween for the length of adjoining fuel element assemblies, said core containing an excess mass of fissionable material in addition to that required to sustain a fission chain reaction whereby an extended core lifetime can be achieved, means for controlling the fission chain reaction within said core comprising a number of elongated movable control rods disposed within some of said flow channels and longitudinally positionable therein, said movable control rods containing a material having a high neutron absorption cross section, a number of replaceable fixed control rods positioned within a portion of the remaining said flow channels, said fixed control rods containing a material having a high neutron absorption cross section similar to that of said movable control rods, said movable control rods and fixed control rods being sufficient to control the excess mass of fuel in said core at initial start-up, and flow control filler rods containing a material having a low neutron absorption cross section and disposed within at least some of the remaining flow channels, said filler rods being of substantially the same shape as and replaceable for said fixed control rods during the lifetime of said core when the excess mass of fissionable material therein has been reduced obviating the need for at least some of said fixed control rods.

7. A core for a nuclear reactor comprising a plurality of elongated fuel element assemblies spaced in a regular pattern to provide intersecting coolant flow channels therebetween for the length of adjoining fuel element assemblies, said core containing an excess mass of fissionable material in addition to that required to sustain a fission chain reaction whereby an extended core lifetime can be achieved, means for controlling the fission chain reaction within said core comprising a number of elongated movable control rods disposed within some of said flow channels and longitudinally positionable therein, said movable control rods containing a material having a high neutron absorption cross section, a number of replaceable fixed control rods positioned within a portion of the remaining said flow channels, said fixed control rods containing a material having a high neutron absorption cross section similar to that of said movable control rods, said movable control rods and fixed control rods being sufficient to control the excess mass of fuel in said core at initial start-up, flow control filler rods containing a material having a low neutron absorption cross section and disposed within at least some of the remaining flow channels, said filler rods being of substantially the same shape as and replaceable for said fixed control rods during the lifetime of said core when the excess mass of fissionable material therein has been reduced obviating the need for at least some of said fixed control rods, and longitudinally extending flux depressor plates positioned about the periphery of the core in closely spaced relationship with the fuel element assemblies located thereat to reduce power peaking in that area of the core.

References Cited by the Examiner

UNITED STATES PATENTS

| | | | |
|---|---|---|---|
| 2,861,033 | 11/58 | Treshow | 176—56 |
| 2,868,706 | 1/59 | Untermyer et al. | 176—32 |
| 2,873,242 | 2/59 | Treshow | 176—56 |
| 2,920,025 | 1/60 | Anderson | 176—65 |

OTHER REFERENCES

Nucleonics, vol. 15, No. 7, July 1957, pp. 60–64.

TID 7532 (Pt. I) October 1957, pp. 188–190, Article by Maienschein.

KAPL–1726, June 15, 1957, pp. 9–16, McKittrick et al.

WAPD–TM–32, December 1956, pp. 7–8, Halgas.

APAE–32, July 15, 1958, pp. 41–64, Williamson.

Proceedings of the International Conference on the Peaceful Uses of Atomic Energy, August 8–20, 1955, vol. 3, pages 58–60, 104–107, 159–161, 164, 214–218, 251–255, published in New York by United Nations.

CARL D. QUARFORTH, *Primary Examiner.*

ROGER L. CAMPBELL, OSCAR R. VERTIZ,
*Examiners.*

---

UNITED STATES PATENT OFFICE

CERTIFICATE OF CORRECTION

Patent No. 3,194,743                                          July 13, 1965

James C. Deddens et al.

It is hereby certified that error appears in the above numbered patent requiring correction and that the said Letters Patent should read as corrected below.

Column 3, line 17, after "9.10" insert -- kg. of $UO_2$ per assembly, and in the zone having assem- --; column 4, line 45, for "26A", second occurrence, read -- 28A --.

Signed and sealed this 12th day of April 1966.

(SEAL)
Attest:

ERNEST W. SWIDER                                                   EDWARD J. BRENNER
Attesting Officer                                                     Commissioner of Patents

UNITED STATES PATENT OFFICE
CERTIFICATE OF CORRECTION

Patent No. 3,194,743                                        July 13, 1965

James C. Deddens et al.

It is hereby certified that error appears in the above numbered patent requiring correction and that the said Letters Patent should read as corrected below.

Column 3, line 17, after "9.10" insert -- kg. of $UO_2$ per assembly, and in the zone having assem- --; column 4, line 45, for "26A", second occurrence, read -- 28A --.

Signed and sealed this 12th day of April 1966.

(SEAL)
Attest:

ERNEST W. SWIDER                                      EDWARD J. BRENNER
Attesting Officer                                           Commissioner of Patents